(12) United States Patent
Huh et al.

(10) Patent No.: US 9,481,251 B2
(45) Date of Patent: Nov. 1, 2016

(54) METHOD AND APPARATUS FOR CONTROLLING REGENERATIVE BRAKING OF HYBRID ELECTRIC VEHICLE

(71) Applicants: Hyundai Motor Company, Seoul (KR); Kia Motors Corporation, Seoul (KR)

(72) Inventors: Jee Wook Huh, Gyeonggi-Do (KR); Kyoung Cheol Oh, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/708,846

(22) Filed: May 11, 2015

(65) Prior Publication Data

US 2015/0321564 A1 Nov. 12, 2015

(30) Foreign Application Priority Data

May 12, 2014 (KR) ........................ 10-2014-0056564

(51) Int. Cl.
| | | |
|---|---|---|
| *B60K 6/48* | (2007.10) | |
| *B60W 10/08* | (2006.01) | |
| *B60W 20/00* | (2016.01) | |
| *B60L 7/18* | (2006.01) | |
| *H02P 3/14* | (2006.01) | |
| *B60W 10/196* | (2012.01) | |
| *B60W 10/188* | (2012.01) | |
| *B60K 6/26* | (2007.10) | |
| *B60L 7/10* | (2006.01) | |
| *B60W 10/18* | (2012.01) | |

(Continued)

(52) U.S. Cl.
CPC . *B60L 7/18* (2013.01); *B60K 6/26* (2013.01); *B60K 6/48* (2013.01); *B60K 6/547* (2013.01); *B60L 7/10* (2013.01); *B60W 10/08* (2013.01); *B60W 10/18* (2013.01); *B60W 10/188* (2013.01); *B60W 10/196* (2013.01); *B60W 20/00* (2013.01); *H02P 3/14* (2013.01); *B60K 2006/4825* (2013.01); *B60W 30/18127* (2013.01); *Y02T 10/6221* (2013.01); *Y02T 10/6252* (2013.01)

(58) Field of Classification Search
CPC ..... B60L 7/18; B60W 10/08; B60W 10/188; B60W 10/196; B60W 30/18127; H02P 3/14
See application file for complete search history.

(56) References Cited

U.S. PATENT DOCUMENTS

| | | | | |
|---|---|---|---|---|
| 6,244,674 B1 * | 6/2001 | Kuno | ........................ | B60L 7/24 180/165 |
| 6,687,593 B1 * | 2/2004 | Crombez | .................. | B60T 1/10 180/170 |

(Continued)

FOREIGN PATENT DOCUMENTS

| | | |
|---|---|---|
| JP | 2014-061795 | 4/2014 |
| KR | 10-2008-0026440 | 3/2008 |
| KR | 10-2008-0036779 | 4/2008 |

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A method and an apparatus for controlling regenerative braking of a hybrid electric vehicle are provided and that adjust a regenerative braking torque by classifying as at least two or more regenerative braking modes and applying different regenerative braking slopes to each mode. The apparatus includes a motor controller that is configured to adjust a driving torque of a motor and a brake controller that is configured to adjust hydraulic pressure supplied to a brake cylinder of a wheel by calculating a braking torque. A hybrid controller is configured to adjust a regenerative braking torque by classifying as at least two or more regenerative braking modes and applying different regenerative braking slopes based on each mode.

14 Claims, 6 Drawing Sheets

(51) Int. Cl.
   *B60K 6/547*     (2007.10)
   *B60W 30/18*     (2012.01)

(56) References Cited

U.S. PATENT DOCUMENTS

| | | | |
|---|---|---|---|
| 6,811,229 B2 * | 11/2004 | Soga | B60K 6/44 188/156 |
| 7,136,737 B2 * | 11/2006 | Ashizawa | B60L 7/26 303/152 |
| 7,503,631 B2 * | 3/2009 | Tezuka | B60K 7/0007 303/152 |
| 9,238,412 B2 * | 1/2016 | Kidston | B60L 7/26 |
| 2005/0200197 A1 * | 9/2005 | Crombez | B60L 7/18 303/152 |
| 2012/0136547 A1 * | 5/2012 | Miyazaki | B60T 1/10 701/70 |
| 2013/0041565 A1 * | 2/2013 | Fujiki | B60T 1/10 701/70 |
| 2014/0183933 A1 * | 7/2014 | Kuhlman | B60T 1/10 303/3 |

* cited by examiner

METHOD AND APPARATUS FOR CONTROLLING REGENERATIVE BRAKING OF HYBRID ELECTRIC VEHICLE

CROSS-REFERENCE TO RELATED APPLICATION

This application claims priority to and the benefit of Korean Patent Application No. 10-2014-0056564 filed in the Korean Intellectual Property Office on May 12, 2014, the entire contents of which are incorporated herein by reference.

BACKGROUND (a) Field of the Invention

The present invention relates to a method and an apparatus for controlling regenerative braking of a hybrid electric vehicle, and more particularly, to a method and an apparatus for controlling regenerative braking of a hybrid electric vehicle that adjust a regenerative braking torque by classifying as at least two or more regenerative braking modes and applying different regenerative braking slope based on each mode.

(b) Description of the Related Art

Generally, a hybrid electric vehicle is driven by an engine which generates torque from fuel combustion and an electric motor which generates torque from an electric battery. In other words, a hybrid electric vehicle has a power device comprised of an engine and a motor and is driven by appropriately using each power that has been generated by a combustion action of the engine and power that is generated by a rotation of a motor using electrical energy that is stored within a battery.

To improve fuel consumption, a vehicle using a power generation control as well as a hybrid electric vehicle uses regenerative braking technology. A regenerative braking system uses a portion of a braking force for power generation upon braking of a vehicle, charges generated electrical energy in a battery, and uses a portion of kinetic energy by a driving speed of a vehicle as energy necessary for driving a generator. Accordingly, a regenerative braking system simultaneously implements reduction of kinetic energy and generation of electrical energy. In addition, a hydraulic pressure braking system which generates braking force based on hydraulic pressure is provided within the hybrid electric vehicle. Since the regenerative braking is generated by only a wheel connected to the motor, regenerative braking cannot satisfy a braking request of a driver.

Therefore, the hydraulic pressure braking and the regenerative braking are performed simultaneously in the hybrid electric vehicle based on an operation of a brake pedal. However, there is a problem caused by a difference of reactivity since reactivity of the regenerative braking system is rapid, on the contrary, reactivity of hydraulic pressure braking system is slow.

A traditional hybrid electric vehicle uses a slope of a straight line while calculating a regenerative braking amount to generate a shock or a deceleration change based on the difference of reactivity between the regenerative braking system and the hydraulic pressure braking system. Moreover, when the slope is decreased to minimize the shock or the deceleration change, the regenerative braking amount also decreases which results deterioration of fuel efficiency.

The above information disclosed in this section is merely for enhancement of understanding of the background of the invention and therefore it may contain information that does not form the prior art that is already known in this country to a person of ordinary skill in the art.

SUMMARY

The present invention provides a method and an apparatus for controlling regenerative braking of a hybrid electric vehicle having advantages of adjusting a regenerative braking torque by classifying as at least two or more regenerative braking modes and applying different regenerative braking slope based on each mode.

An exemplary embodiment of the present invention provides an apparatus for controlling regenerative braking of a hybrid electric vehicle that may include a motor controller configured to adjust a driving torque of a motor; a brake controller configured to adjust hydraulic pressure supplied to a brake cylinder of a wheel by calculating a braking torque; and a hybrid controller configured to adjust a regenerative braking torque by classifying as at least two or more regenerative braking modes and applying different regenerative braking slope based on each mode.

The hybrid controller may be configured to classify regenerative braking modes into a regenerative braking occurrence mode, a regenerative braking increase mode and a regenerative braking maximum mode based on a regenerative braking torque. The regenerative braking occurrence mode may be determined as a range where the regenerative braking torque is less than a first predetermined torque. The regenerative braking increase mode may be determined as a range where the regenerative braking torque is greater than or equal to the first predetermined torque and less than a second predetermined torque. The regenerative braking maximum mode may be determined as a range where the regenerative braking torque is greater than or equal to the second predetermined torque. The hybrid controller may be configured to prevent regenerative braking when the regenerative braking torque increases and reaches a regenerative braking capacity which decreases when regenerative braking is requested while being limited. The regenerative braking torque may be calculated based on a current vehicle speed and a total braking amount.

Another exemplary embodiment of the present invention provides a method for controlling regenerative braking of a hybrid electric vehicle that may include determining a target regenerative braking amount when regenerative braking of the hybrid electric vehicle is requested; classifying as at least two or more regenerative braking modes based on a regenerative braking torque based on the target regenerative braking amount and applying different regenerative braking slope based on the classified regenerative braking mode; and adjusting a regenerative braking amount based on the regenerative braking slope.

The applying of different regenerative braking slopes based on the classified regenerative braking mode may include applying a slope of a regenerative braking occurrence mode when the regenerative braking torque is less than a first predetermined torque; applying the slope of a regenerative braking increase mode when the regenerative braking torque is greater than or equal to the first predetermined torque and less than a second predetermined torque; and applying the slope of a regenerative braking maximum mode when the regenerative braking torque is greater than or equal to than the second predetermined torque.

The method may further include determining whether regenerative braking is requested while being limited; calculating an increase time of the regenerative braking torque and a time point where the regenerative braking torque reaches a regenerative braking capacity when the regenerative braking is requested while being limited; and maintaining the limitation of regenerative braking when the regenerative braking capacity is decreasing at the time point where the regenerative braking torque reaches the regenerative braking capacity. The increase of time and the reach time point of the regenerative braking torque may be calculated based on a current vehicle speed and a total braking amount.

Yet another exemplary embodiment of the present invention provides a method for controlling regenerative braking of a hybrid electric vehicle that may include determining whether regenerative braking is requested while being limited; calculating an increase of time of the regenerative braking torque and a time point where the regenerative braking torque reaches a regenerative braking capacity when the regenerative braking is requested while being limited; and maintaining the limitation of regenerative braking when the regenerative braking capacity is decreasing at the time point where the regenerative braking torque reaches the regenerative braking capacity. The increase of time and the reach time point of the regenerative braking torque may be calculated based on a current vehicle speed and a total braking amount.

As described above, according to an exemplary embodiment of the present invention, deceleration linearity may be improved in an initial stage of regenerative braking. In addition, fuel efficiency of the hybrid electric vehicle may be improved by maximizing energy recovery in a middle stage of regenerative braking.

BRIEF DESCRIPTION OF THE DRAWINGS

The attached drawings illustrate exemplary embodiments of the present invention, and are provided for describing the present invention in more detail, but not for limiting technical aspects of the present invention.

DETAILED DESCRIPTION

Figure 1:
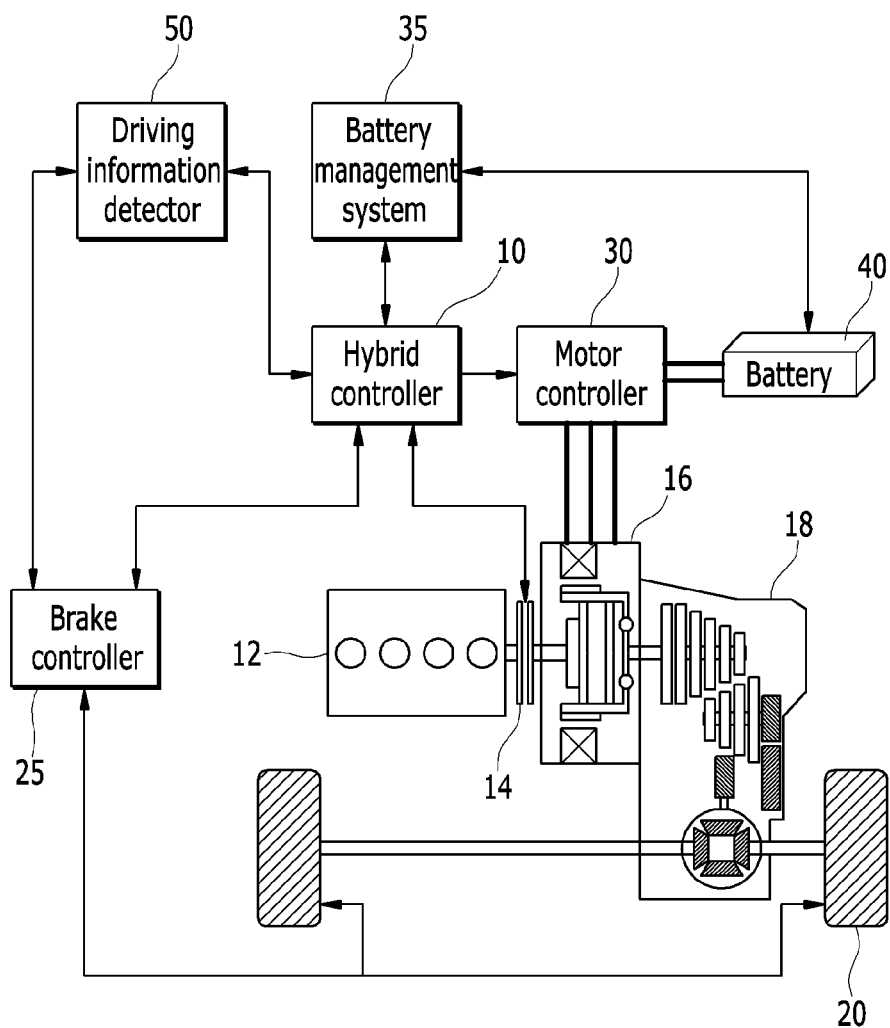
FIG. 1 is an exemplary schematic block diagram of an apparatus for controlling regenerative braking of a hybrid electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

An exemplary embodiment of the present invention will hereinafter be described in detail with reference to the accompanying drawings. Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

FIG. 1 is an exemplary schematic block diagram of an apparatus for controlling regenerative braking of a hybrid electric vehicle according to an exemplary embodiment of the present invention. As shown in FIG. 1, an apparatus for controlling regenerative braking of a hybrid electric vehicle according to an exemplary embodiment of the present invention may include an engine 12, an engine clutch 14, a motor 16, a transmission 18, a wheel 20, a brake controller 25, a motor controller 30, a battery management system 35, a battery 40, a driving information detector 50 and a hybrid controller 10.

The hybrid electric vehicle according to an exemplary embodiment of the present invention may provide a driving mode in which the engine 12 and the motor 16 separately or simultaneously operate as a power source. For this purpose, the engine clutch 14 may be disposed between the engine 12 and the motor 16 to selectively connect the engine 12 and the motor 16 and transmit power to the wheel 20.

The motor 16 may be operated by a 3-phase alternating current (AC) voltage based on a control signal applied from the motor controller 30 and may be configured to generate a torque. Additionally, the motor 16 may be operated as a generator in coast down driving to supply a voltage to the battery 40. The motor controller 30 may be configured to execute driving and adjust torque of the motor 16 according to the hybrid controller 10 and store electricity generated in the motor 16 at the battery 40 upon regenerative braking. For these purposes, the motor controller 30 may be provided with one or more microprocessors, and the one or more microprocessor may be executed by a predetermined program for performing a method of controlling driving and torque of the motor 16.

The transmission 18 may be configured to supply a sum of an output torque of the engine 12 and an output torque of the motor 16 determined by coupling and releasing of the engine clutch 14 as an input torque, and select a shift gear based on a vehicle speed and a driving condition to output driving force to a driving wheel and maintain driving. The transmission 18 may be a fixed end decelerator or an automatic transmission of many shift speeds, but it is not limited thereto. When the transmission 18 is the automatic transmission of multiple shift speeds, a gear ratio may be adjusted by a control signal from the hybrid controller 10.

The battery 40 may be formed with a plurality of unit cells, and a high voltage for providing a driving voltage to the motor 16 may be stored in the battery 40. The battery 40 may be configured to supply a driving voltage to the motor 16 in an electric vehicle (EV) mode or hybrid electric vehicle (HEV) mode, and may be charged with a voltage generated in the motor 16 upon regenerative braking. When a commercial power source is plug-in connected, the battery 40 may be charged by a voltage and a current supplied via a charge device.

The battery management system 35 may be configured to comprehensively detect information such as a voltage, a current, and a temperature of the battery 40 to manage and control a charge state, and adjust a state of charge (SOC) based on a control signal from the hybrid controller 10. The battery management system 35 may be configured to prevent the battery 40 from being discharged to a limited voltage or less or being overcharged to a limited voltage or more.

The brake controller 25 may be configured to calculate a braking amount of hydraulic pressure of a pedal stroke and hydraulic pressure of a master cylinder when a braking operation is requested. Then, the brake controller 25 may be configured to adjust hydraulic pressure braking supplied to a brake cylinder of each wheel 20 based on the braking amount of hydraulic pressure. For these purposes, the brake controller 25 may include one or more microprocessors, and the one or more microprocessor may be executed by a predetermined program for performing a method of controlling hydraulic pressure braking.

The driving information detector 50 may be configured to detect a running state of the electric vehicle and the brake demand of the driver, and transmit a corresponding signal to the hybrid controller 10. The driving information detector 50 may include at least one of an engine speed sensor configured to detect an engine speed, a motor speed sensor configured to detect a motor speed, a vehicle speed sensor configured to detect a vehicle speed, an accelerator pedal position sensor configured to detect a position value of an accelerator pedal (e.g., an engagement degree of the acceleration pedal), and a brake pedal position sensor configured to detect a position value of a brake pedal (e.g., an engagement degree of the brake pedal).

The hybrid controller 10 may be an uppermost controller and may be configured to operate subordinate controllers that are connected to a network and collect and analyze information of each subordinate controller to execute entire operations of the hybrid electric vehicle. Further, the hybrid controller 10 may be configured to adjust a regenerative braking torque by classifying as at least two or more regenerative braking modes and applying different regenerative braking slopes of each mode. In addition, the hybrid controller 10 may be configured to prevent regenerative braking when the regenerative braking torque increases and reaches a regenerative braking capacity decreasing when regenerative braking is requested while being limited.

The regenerative braking modes may be a regenerative braking occurrence mode, a regenerative braking increase mode and a regenerative braking maximum mode based on the regenerative braking torque. For these purposes, the hybrid controller 10 may include one or more microprocessors, and the one or more microprocessor may be executed by a predetermined program for performing a method for controlling regenerative braking of a hybrid electric vehicle according to an exemplary embodiment of the present invention.

Hereinafter, a method for controlling regenerative braking of a hybrid electric vehicle according to an exemplary embodiment of the present invention will be described in detail with reference to FIG. 2 to FIG. 6.

Figure 2:
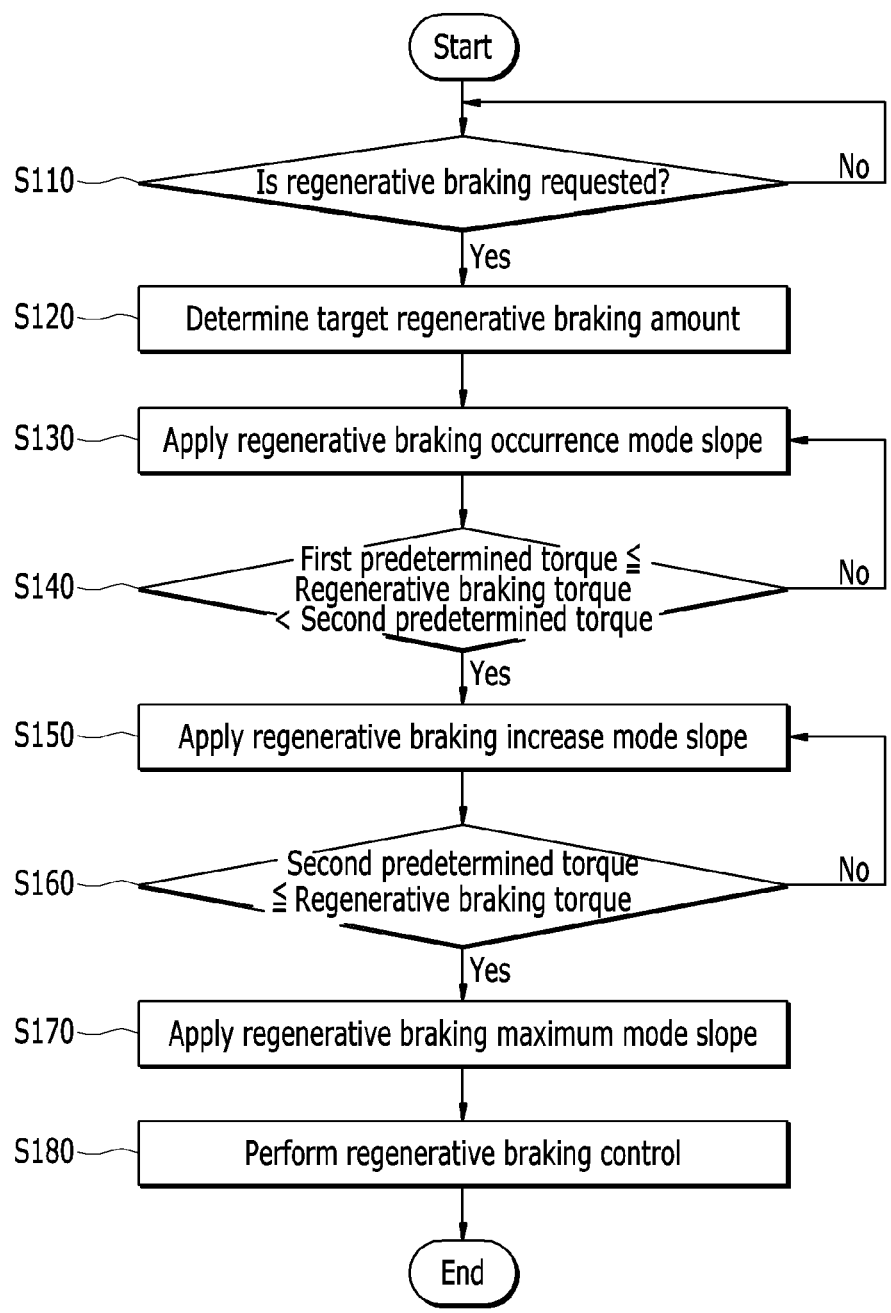
FIG. 2 is an exemplary flowchart showing a method for controlling regenerative braking of a hybrid electric vehicle according to an exemplary embodiment of the present invention.

FIG. 2 is an exemplary flowchart showing a method for controlling regenerative braking of a hybrid electric vehicle according to an exemplary embodiment of the present invention. As shown in FIG. 2, a method for controlling regenerative braking of a hybrid electric vehicle according to an exemplary embodiment of the present invention begins with determining whether regenerative braking of the hybrid electric vehicle is requested by hybrid controller 10 based on driving information detected by driving information detector 50 at step S110.

When the regenerative braking is requested at the step S110, the hybrid controller 10 may be configured to calculate a target regenerative braking amount based on a driving torque of the motor 16, an output torque of the engine 12, and a hydraulic pressure braking amount adjusted by the brake controller 25 at step S120. When the target regenerative braking amount is calculated at the step S120, the regenerative braking torque may be determined. Thus, the motor controller 30 may be configured to execute regenerative braking by the motor 16 and the brake controller 25 may be configured to adjust hydraulic pressure braking supplied to a brake cylinder of a wheel based on the regenerative braking torque. Herein, the hybrid controller 10 may be configured to apply a regenerative braking occurrence mode slope in an initial stage of regenerative braking at step S130.

The regenerative braking occurrence mode slope may be applied when the regenerative braking torque is less than a first predetermined torque to be applied in the initial stage of regenerative braking. The first predetermined torque may be determined using a predetermined test. The regenerative braking occurrence mode slope may minimize a regenerative braking slope since initial reactivity of hydraulic pressure braking is substantially slow. Thus, the hydraulic pressure braking may track the regenerative braking.

Furthermore, the hybrid controller 10 may be configured to determine whether the regenerative braking is in a middle stage after the initial stage of regenerative braking. In other words, the hybrid controller 10 may be configured to determine whether the regenerative braking torque is greater than or equal to the first predetermined torque and less than a second predetermined torque at step S140. The second predetermined torque may be determined as a value obtained by subtracting the regenerative braking torque at a changing point of the regenerative braking entry slope from a regenerative braking maximum torque.

When the regenerative braking torque is greater than or equal to the first predetermined torque and less than the second predetermined torque at the step S140, the hybrid controller 10 may be configured to apply a regenerative braking increase mode slope at step S150. The regenerative braking increase mode slope may maximize energy recovery by being increased a slope since hydraulic pressure braking may track regenerative braking in the middle stage of the regenerative braking.

Further, the hybrid controller 10 may be configured to determine whether the regenerative braking is in a last stage. In other words, the hybrid controller 10 may be configured to determine whether the regenerative braking torque is greater than or equal to a second predetermined torque at step S160. When the regenerative braking torque is greater than or equal to the second predetermined torque at the step S160, the hybrid controller 10 may be configured to apply a regenerative braking maximum mode slope at step S170. The regenerative braking maximum mode slope may prevent a phenomenon in which hydraulic pressure braking cannot track the regenerative braking when the regenerative braking approaches a peak. Thus, the regenerative braking maximum mode slope may decrease the regenerative braking increase mode slope. After that, the hybrid controller 10 may be configured to execute regenerative braking based on a slope of each regenerative braking mode at step S180.

Figure 3:
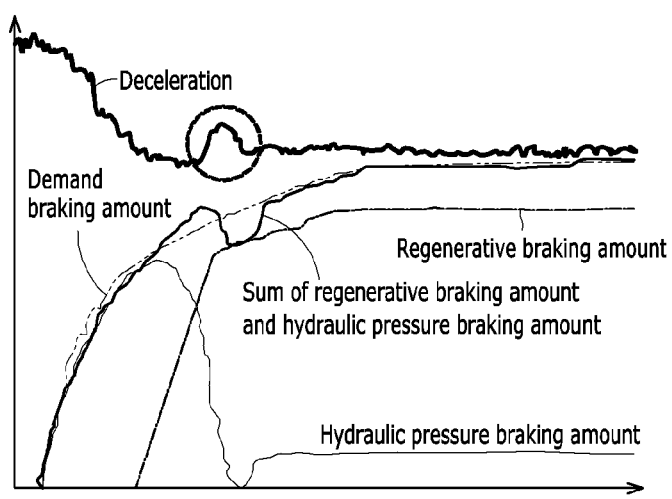
FIG. 3 is an exemplary graph showing deceleration of a hybrid electric vehicle according to hydraulic pressure braking and regenerative braking in a traditional hybrid electric vehicle according to the related art.
Figure 4:
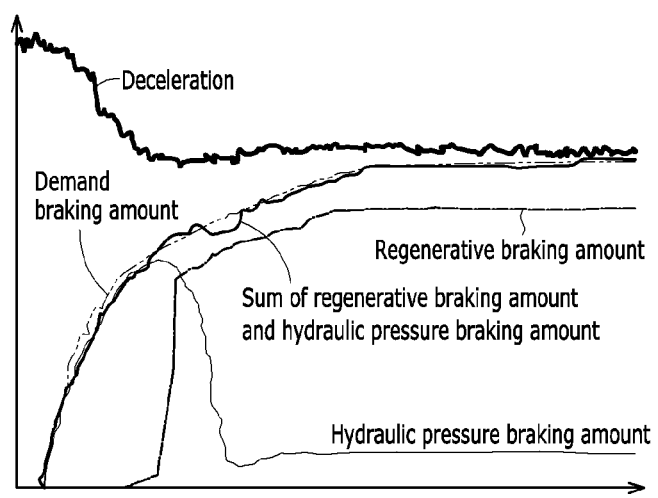
FIG. 4 is an exemplary graph showing deceleration of a hybrid electric vehicle according to hydraulic pressure braking and regenerative braking in a hybrid electric vehicle to which a method for controlling regenerative braking of a hybrid electric vehicle according to an exemplary embodiment of the present invention is applied.

FIG. 3 is an exemplary graph showing deceleration of a hybrid electric vehicle according to hydraulic pressure braking and regenerative braking in a traditional hybrid electric vehicle according to the related art and FIG. 4 is an exemplary graph showing deceleration of a hybrid electric vehicle according to hydraulic pressure braking and regenerative braking in a hybrid electric vehicle to which a method for controlling regenerative braking of a hybrid electric vehicle according to an exemplary embodiment of the present invention is applied.

As shown in FIG. 3, a slope of the regenerative braking amount is a straight line without changing. Therefore, a shock during braking may be generated in the initial stage of regenerative braking, and a slip during braking may be generated in the last stage of regenerative braking. On the other hand, as shown in FIG. 4, a slope of the regenerative braking amount may be changed in three levels by applying a method for controlling regenerative braking of a hybrid electric vehicle according to an exemplary embodiment of the present invention. Therefore, drivability and fuel consumption of the hybrid electric vehicle may be improved.

Figure 5:
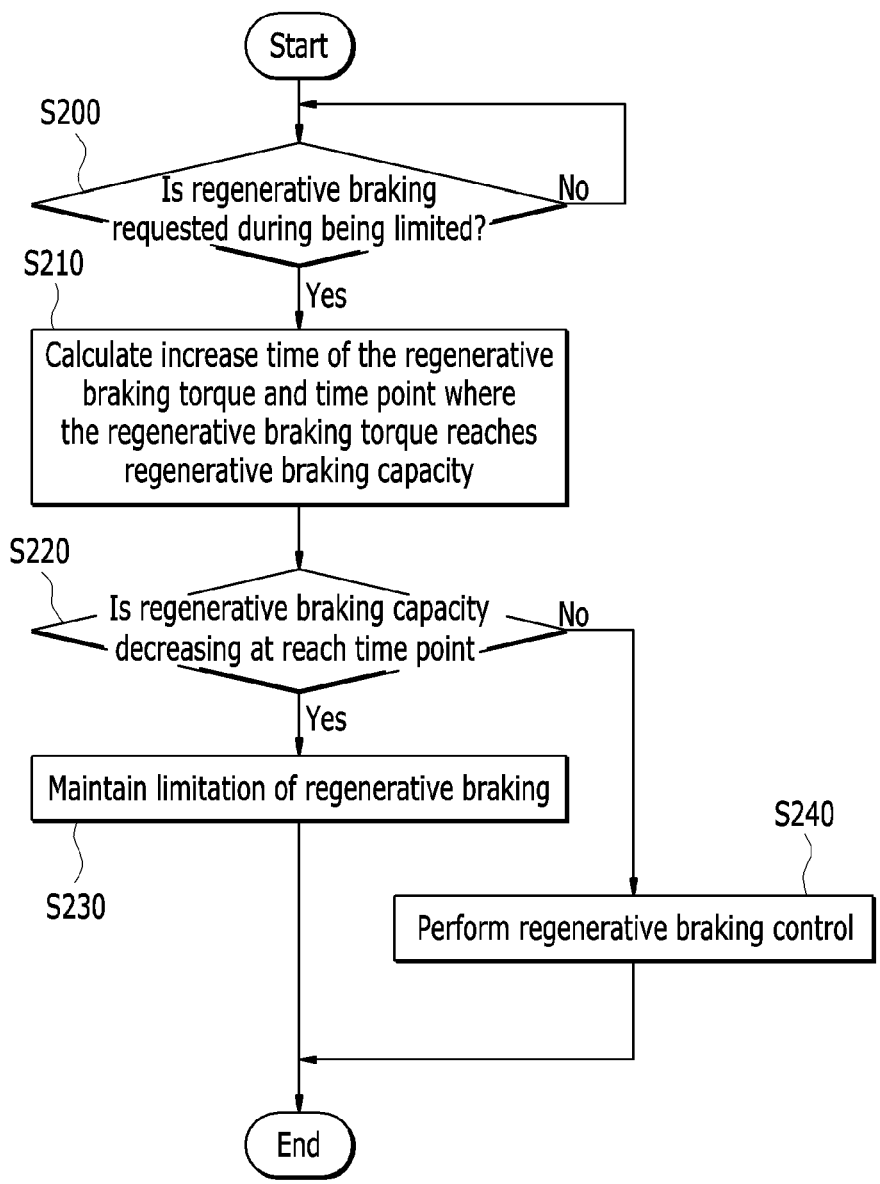
FIG. 5 is an exemplary flowchart showing a method for controlling regenerative braking of a hybrid electric vehicle according to another exemplary embodiment of the present invention.

FIG. 5 is an exemplary flowchart showing a method for controlling regenerative braking of a hybrid electric vehicle according to another exemplary embodiment of the present invention. As shown in FIG. 5, hybrid controller 20 may be configured to determine whether regenerative braking is requested while regenerative braking is limited at step S200. Herein, the limitation of regenerative braking may indicate that braking of the hybrid electric vehicle is performed by only hydraulic pressure braking at step S200.

When regenerative braking is performed during braking of the hybrid electric vehicle is performed by only hydraulic pressure braking, the hydraulic pressure braking amount may be decreased. When the hydraulic pressure braking amount is compulsorily decreased to satisfy a demand braking amount, a substantial shock may be generated. When the regenerative braking is requested while being limited at the step S200, the hybrid controller 20 may be configured to calculate a time increase of the regenerative braking torque and a time point where the regenerative braking torque reaches a regenerative braking capacity calculated based on a current vehicle speed and a total braking amount at step S210.

Additionally, the hybrid controller 10 may be configured to determine whether the regenerative braking capacity is decreasing at the time point where the regenerative braking torque reaches the regenerative braking capacity at step S220. When the regenerative braking capacity is decreasing at the time point where the regenerative braking torque reaches the regenerative braking capacity at the step S220, the hybrid controller 10 may be configured to maintain the limitation of regenerative braking at step S230. In other words, the hybrid controller 20 may not perform regenerative braking control and may be configured to perform hydraulic pressure braking to decelerate the hybrid electric vehicle.

Furthermore, when the regenerative braking capacity is not decreasing at the time point where the regenerative braking torque reaches the regenerative braking capacity at the step S220, the hybrid controller 20 may be configured to perform regenerative braking control at step S240. Herein, the hybrid controller 10 may be configured to execute regenerative braking based on each regenerative braking mode as described above.

Figure 6:
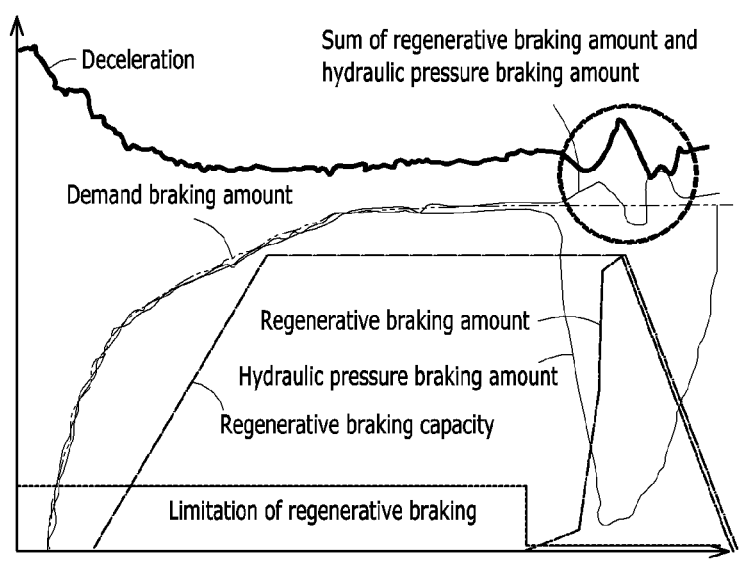
FIG. 6 is an exemplary graph showing deceleration of a hybrid electric vehicle according to a regenerative braking capacity and a regenerative braking amount in a traditional hybrid electric vehicle when regenerative braking is requested while being limited according to the related art.

FIG. 6 is an exemplary graph showing deceleration of a hybrid electric vehicle according to a regenerative braking capacity and a regenerative braking amount in a traditional hybrid electric vehicle when regenerative braking is requested while being limited. As shown in FIG. 6, when the regenerative braking is increased and reaches the regenerative braking capacity which is decreasing, the regenerative braking amount is sharply reduced based on regenerative braking capacity. Thus, deceleration shock may be generated. On the other hand, according to an exemplary embodiment of the present invention, the limitation of regenerative braking may be maintained, thus improving drivability of the hybrid electric vehicle.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

10: hybrid controller
12: engine
14: engine clutch
16: motor
18: transmission
20: wheel 25: brake controller
30: motor controller
35: battery management system
40: battery
50: driving information detector

What is claimed is:

1. An apparatus for controlling regenerative braking of a hybrid electric vehicle, comprising:
   a motor controller configured to adjust a driving torque of a motor;
   a brake controller configured to adjust hydraulic pressure supplied to a brake cylinder of a wheel by calculating a braking torque; and
   a hybrid controller configured to adjust a regenerative braking torque by classifying at least two or more regenerative braking modes and applying different regenerative braking slopes based on each mode,
   wherein the regenerative braking modes include a regenerative braking occurrence mode and a regenerative braking increase mode based on a regenerative braking torque.

2. The apparatus of claim 1, wherein the regenerative braking modes further include a regenerative braking maximum mode based on a regenerative braking torque.

3. The apparatus of claim 2, wherein the regenerative braking occurrence mode is determined as a range where the regenerative braking torque is less than a first predetermined torque.

4. The apparatus of claim 3, wherein the regenerative braking increase mode is determined as a range where the regenerative braking torque is greater than or equal to the first predetermined torque and less than a second predetermined torque.

5. The apparatus of claim 4, wherein the regenerative braking maximum mode is determined as a range where the regenerative braking torque is greater than or equal to the second predetermined torque.

6. The apparatus of claim 2, wherein a slope of the regenerative braking increase mode is larger than a slope of the regenerative braking occurrence mode slope.

7. The apparatus of claim 6, wherein the slope of the regenerative braking increase mode is larger than a slope of the regenerative braking maximum mode.

8. The apparatus of claim 1, wherein the hybrid controller is configured to prevent regenerative braking when the regenerative braking torque increases and reaches a regenerative braking capacity which is decreasing when regenerative braking is requested while being limited.

9. The apparatus of claim 8, wherein the regenerative braking torque is calculated based on a current vehicle speed and a total braking amount.

10. A method for controlling regenerative braking of a hybrid electric vehicle, comprising:
    determining, by a controller, a target regenerative braking amount when regenerative braking of the hybrid electric vehicle is requested;
    classifying, by the controller, at least two or more regenerative braking modes based on a regenerative braking torque according to the target regenerative braking amount and applying different regenerative braking slopes according to the classified regenerative braking mode;
    adjusting, by the controller, a regenerative braking amount based on the regenerative braking slope;
    determining, by the controller, whether regenerative braking is requested while being limited;
    calculating, by the controller, a time increase of the regenerative braking torque and a time point where the regenerative braking torque reaches a regenerative braking capacity when the regenerative braking is requested while being limited; and
    maintaining, by the controller, the limitation of regenerative braking when the regenerative braking capacity is decreasing at the time point where the regenerative braking torque reaches the regenerative braking capacity.

11. The method of claim 10, wherein the applying of different regenerative braking slopes according to the classified regenerative braking mode includes:
    applying, by the controller, a slope of a regenerative braking occurrence mode when the regenerative braking torque is less than a first predetermined torque;
    applying, by the controller, the slope of a regenerative braking increase mode when the regenerative braking torque is greater than or equal to the first predetermined torque and less than a second predetermined torque; and
    applying, by the controller, the slope of a regenerative braking maximum mode when the regenerative braking torque is greater than or equal to the second predetermined torque.

12. The method of claim 10, wherein the time increase and the reach time point of the regenerative braking torque is calculated based on a current vehicle speed and a total braking amount.

13. A method for controlling regenerative braking of a hybrid electric vehicle, comprising:
    determining, by a controller, whether regenerative braking is requested during being limited;
    calculating, by the controller, a time increase of the regenerative braking torque and a time point where the regenerative braking torque reaches a regenerative braking capacity when the regenerative braking is requested while being limited; and
    maintaining, by the controller, the limitation of regenerative braking when the regenerative braking capacity is decreasing at the time point where the regenerative braking torque reaches the regenerative braking capacity.

14. The method of claim 13, wherein the time increase and the reach time point of the regenerative braking torque is calculated based on a current vehicle speed and a total braking amount.

* * * * *